Feb. 2, 1960 H. D. CLARK ET AL 2,923,542
GLASS FIBER JIGS
Filed July 18, 1955 3 Sheets-Sheet 1

INVENTORS
HAROLD D. CLARK AND
ARNOLD W. JOHNSON
BY Edwin Coates
-ATTORNEY-

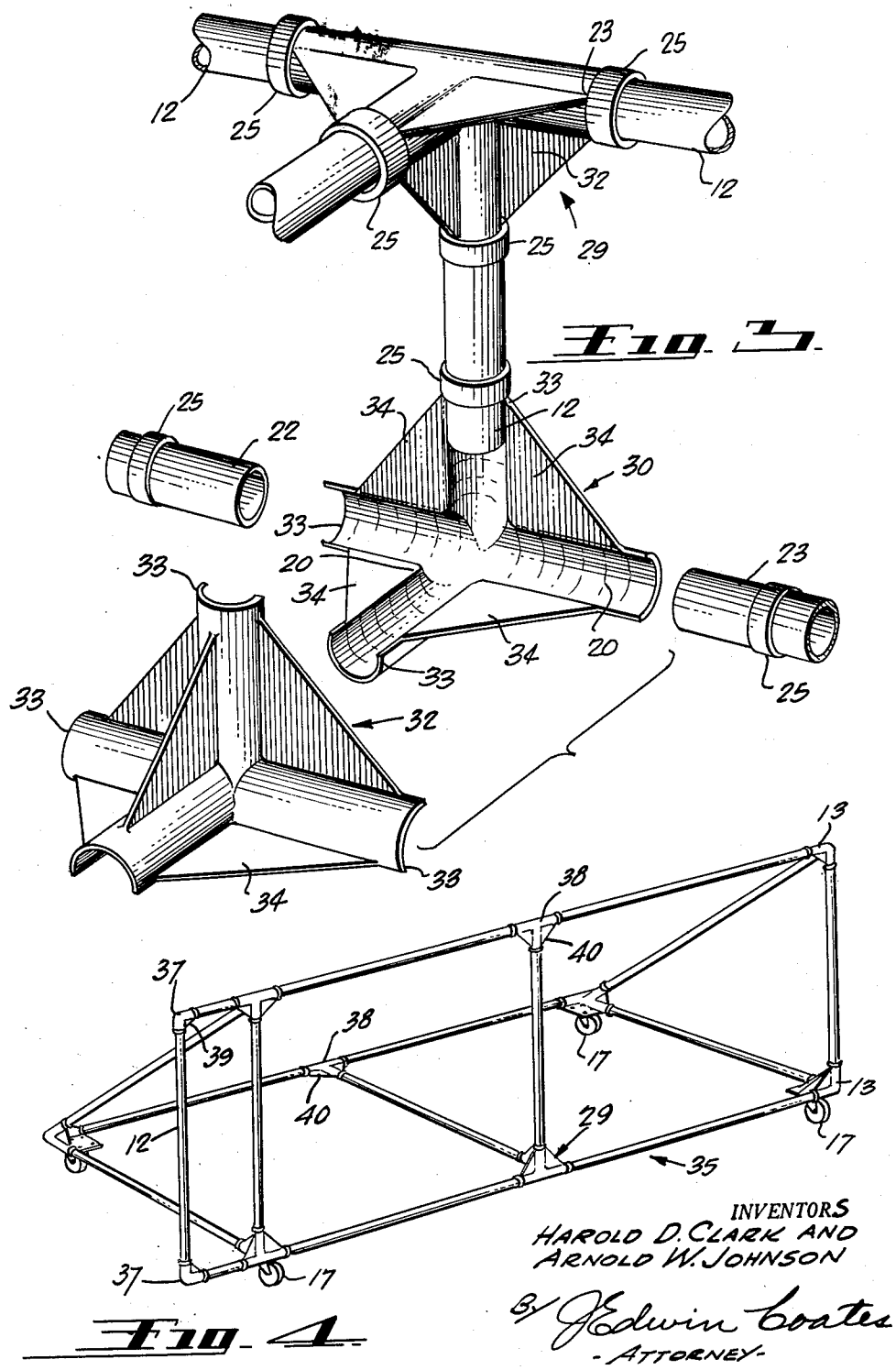

United States Patent Office 2,923,542
Patented Feb. 2, 1960

2,923,542
GLASS FIBER JIGS

Harold D. Clark, Santa Monica, and Arnold W. Johnson, Los Angeles, Calif., assignors to Douglas Aircraft Company, Inc., Santa Monica, Calif.

Application July 18, 1955, Serial No. 522,428

6 Claims. (Cl. 269—136)

This invention relates to tubular framework articles and particularly to those constructed as reinforcing or supporting framing for carrying tool-fixtures or matrices, such as hollow contoured plastic laminates, to constitute tooling jigs, especially for sheet-metal drilling, routing, welding, trimming, riveting and the like.

Currently, such frame works are constructed entirely of metal and consist of metallic tubes joined in jig-conformation by means of metallic corner fittings or metallic gusset plates welded to the tubing. Obviously, such articles, although open, or "hollow," may reach a considerable poundage per unit, and, further than being heavy, voluminous and onerous to move about, have a rather low ratio of total strength to weight, one that is incommensurate with its use-life and with the manhours of labor required to fabricate them.

Rather more important, however, is the fact that in assembling and welding such welded-plate or socket jigs, the residual stresses left in the framework upon cooling, often react upon the laminated tool-fixture mounted in the jig and permanently deform and distort it to an extent rendering it unfit for use. Moreover, these residual stresses cause the jig frame to be unable to hold tolerances and many times even the process of "normalizing" the welds have failed to remedy the situation.

The present invention deals effectively with these, and other, problems by providing a novel type of framework and advanced jointures therein, together with a novel method of establishing the jointures. Briefly, an entire jig, including the tool-base, fixture or matrix, the tubular members, and the members or fittings that unite the tubular members to form the framework are each composed of sheets of synthetic, thermosetting "plastic," such as glass fiber woven cloth, each sheet being impregnated with an expoxy resin and the sheets being laminated together with this resin in the form of tubes and tube-joining fittings. Generally in the same basal manner as with metallic jigs, these tubes and fittings are configured together to form any desired shape or kind of jig, that is, supporting framework for laminated contoured tooling matrices or other articles.

Each "plastic" fitting employed in joining the tubes comprises, essentially, a pair of facewise matching sheets, each sheet consisting, preferably, of a plurality of glass fiber woven cloth laminae impregnated as above, and each of said sheets being so angled and indented as, in conjunction with its mate, to head-up two, three, four or more tube-ends to unite them at a corner, say, of the framework. The indentations are deep and elongate-hemicylindrical and are arranged in a fitting-half to mate with those in the complementary fitting half so as to define sockets for coaxially seating the tube ends in the fitting to define the framework.

The mode or method of uniting the fittings and the tube ends to establish the jointures and complete the framework is also of the essence of the invention and essentially consists of post-bonding the fitting halves together and to the tube ends subsequent to the insertion of the tube ends into the fittings and seats, contrary to previous practices, in which tube-to-fitting bonding is achieved by first inserting adhesive-coated tube ends into inseparable or one-piece socket members whereby the adhesive was wiped off most of the tube-ends during insertion thereof, producing a weak joint. In this invention, instead of one-piece socket fittings, each fitting comprises two halves and the two-halves are not matched or fitted together until after the adhesive-coated tube-ends are seated by "laying" the tube-ends into the seats, the tube-ends addressing said seats entirely from the lateral direction and approaching the inner face of a first sheet, the second sheet then being applied facewise to the first sheet over the thus-seated tube-end. This configuration and procedure are thus in distinct contrast to the prior practice, when coupling tube-ends plastically, of merely longitudinally urging a coated tube-end endwise into bare, but completely cylindrical sockets for the tube-ends. The final thermosetting bonding together of the tubes and fitting halves thus constitutes a "post" bonding operation. The bonding material preferably consists of a thermosetting mixture of epoxy resin with an amine catalyst. The catalyst triggers an exothermic (thermosetting) polymerization reaction with the resin which hardens the resin and integrates it, the tube-ends and the plastic fitting halves into a monolithic block, in effect.

Other principles, functions and advantages of the invention will either be set forth or become manifest as this disclosure proceeds.

Merely in order to further clarify the inventive concepts and render them more concrete, a few of the presently-preferred embodiments thereof are illustrated representationally in the accompanying drawings and are described hereinafter in conjunction therewith.

In these drawings:

Figure 3 is an expanded, fragmentary perspective view of a portion of another jig-frame in which a vertical column is tied into the medial portions of horizontal tubes by means of four-way fittings; and Figure 4 is a perspective view of a jig omitting the "tool" fixture or matrix and showing the use made of L and T fittings for uniting various tubular portions of the framework.

Figure 1:
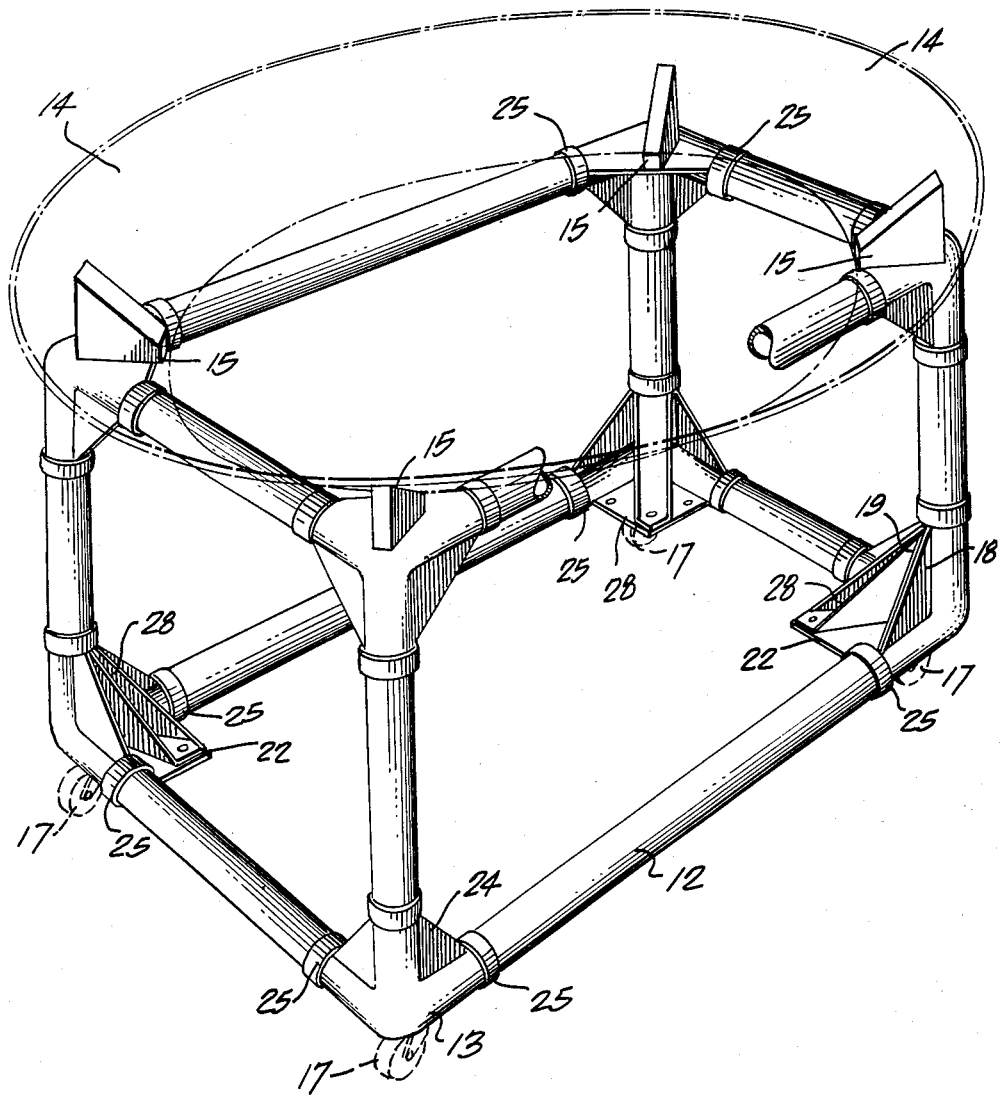
Figure 1 is a perspective view of a jig of the type that includes a laminated plastic, jig-tool or matrix or fixture supported by, and bonded to, a plastic thermosetting tubular reinforcing framework fabricated with tube-uniting corner fittings constituting a constituent of this invention.

The jig illustrated representationally in Figure 1 is a composite of several of the general features of the invention but emphasizes the use of a plurality of the three-way corner fittings. Therein it comprises a supporting framework principally made up of plastic, thermosetting tubes 12 arranged in hollow parallelopipedal configuration and united at the corners by three-way corner fittings 13. The jig, in addition to the framework, as usual includes a plastic, laminated jig-tool fixture, or matrix, 14 mounted therein by means of plastic, thermosetting block-like spacers, struts, or abutments 15 bonded to the member 14 and to the jig-framework. Member 14 may consist of the workpiece itself. The metallic workpiece is supported congruently in the jig tool 14 for drilling, or other, handtool operations thereon. To render the jig portable, it may be provided at each corner with a swivelling caster 17.

Each of the corner fittings 13 is a twin-half laminate constituted of glass fiber woven cloth, the glass fiber laminae of each half being impregnated with an epoxy resin in order to stiffen and rigidify same and impart thereto the other desirable characteristics hereinafter appearing. The fittings are made up of facewise mating inner and outer halves, 18 and 19, and these halves are united by means of a post-bonding method, later explained, employing a layer of thermosetting cementitious material 20 on the mating faces in order to integrate the two halves over the tube ends seated therein, as later explained. Incidentally, in the production of each laminated half, 18 and 19, of each of the corner fittings, of Figure 2, there is employed a trihedral angled mold bearing triangularly intersecting hemicylindric projections corresponding to the cylindric seats to be made in the fitting for the tube-ends and intersecting triangularly in the sheets. On this mold a series of layers of glass fiber woven fabric, impregnated with the hardening agent aforesaid, are laid down, being integrated into a rigid, trihedral-angled fitting-half by means of the cementitious material mentioned above. Upon removal from the mold block, each fitting half consists of a trihedral-angled, rigid sheet, the trihedral angled fitting including a rectangular caster attachment web 22, three tube-end seats in the form of hemi-cylindrical elongate indentations 23, the three meeting in a common locus at the apex of the trihedral angle, and a pair of uniting and bracing webs 24 connecting the seats 23 together. Fitting halves so conformed are ready for a layer 20 of cementitious material utilized according to the present post-bonding method to integrate the halves together and over, and to, the three tube-ends seated therein.

The siccative bearing fitting-halves are pressed together, with or without the aid of locking rings, later described and the epoxy-resin and amine bonding material undergoes an exothermic, or thermosetting reaction in which the resin polymerizes and hardens and sets into monolithic condition.

It is to be perceived that, by this post-bonding mode of joining the tubular members 12, rendered feasible by virtue of the twin-half configuration of the fittings and their special composition, contrary to the current practices the entire cylindric surface of each tube-end, as well as that of the seats 23, remains fully coated with the cementitious material instead of being wiped off by the usual act of inserting adhesive coated tube-ends into bare seats in already integrated or pre-welded metallic fittings.

Thus, in addition to eliminating the jig and tool deformation produced by the reaction thereon from the frame of the warping and residual stresses unavoidably set up in ordinary welded-metal jigs, welding of the tubing into the fittings is obviated while nonetheless providing a jointure that, for all practical purposes, is as integral, tight and secure as a welded jig-joint.

Figure 2:
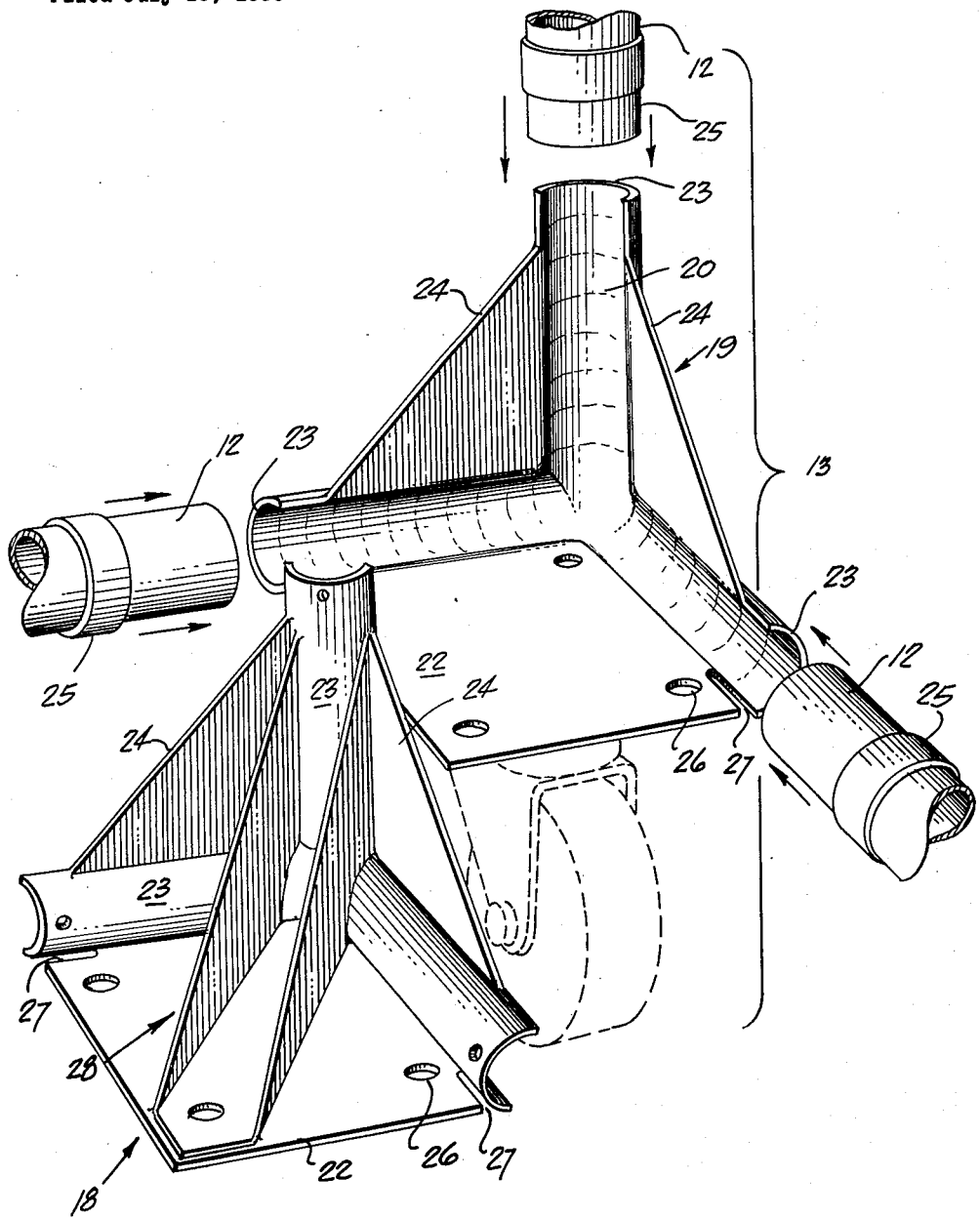
Figure 2 is an expanded fragmentary perspective view of one of the corners of the jig-frame shown in Figure 1, clarifying the details of a three-way tube-coupling or fitting.

Although such jointure is ordinarily quite adequate to withstand all ordinary usages and loads encountered in the industries where such jigs are employed, to meet the contingency that, on special occasions unusual loads might be applied to the jig, means are provided for not only holding the halves together during the thermosetting operation but for thereafter transforming shear into hoop tension. In the species shown in Figure 2, these means comprise the combination of plastic, thermosetting hardened glass fiber, movable locking rings 25 encircling the outer ends of the socket-members 23 and slots 27 therefor formed adjacent these outer ends. While the jointure is still "wet," if desired, these rings may be slid, as shown in Figure 2, into hoop-tension taking position around the members 23 so as to not only fix and hold the polymerizing halves in exact registration while the siccative sets but to positively prevent subsequent displacement thereof. Thereby, the bonded strength of the jointure is enhanced, enabling the fittings to be employed with a wide range of loads.

In the event that excessive loads are to be applied to a jig designed for lesser loads, mechanical aids, such as Parker-Kalon self-tapping screws, may be employed, being passed thru the fitting halves underneath the locking rings. Also for this contingency, each fitting and tube may consist of a larger number of plies than for ordinary work. Knee-braces 28 are provided to resist vertical flexure or bending inwardly or outwardly at the joint.

In Figure 3 there is depicted an application of the inventive concepts to the co-joining of four tube-ends at a common locus. Here, as in the preceding species, each jointure-fitting 29 consists of two-halves facewise mating and cementitiously united together to and over the tube ends. The outer half, 30 and the inner half, 32, as before, consist of integrated laminae of glass fiber impregnated with, and united with, the epoxy resin, the two halves being post-bonded over the tube ends in the aforesaid manner and with the aforementioned cementitious material, preferably. Again, by the provision of halved fitting-units and the clamping of the pre-coated halves fully in bonding contact with the entire surface of each tube end, that is, by postbonding, a lighter, strong jointure, devoid of residual stress and warp, is provided.

As shown, each four-way fitting comprises a pair of laminated, hardened sheets of glass fiber woven cloth impregnated with an epoxy resin and each sheet essentially consists of a dihedral-angled quadrilateral expanse, minus the base plate of Figure 2, of course and with four tube-end seats 33 and four bracing webs 34 uniting same.

In this species, as well as in the preceding one, locking rings 25 are provided but since the ends of the seat portions 33 protrude farther from the webs 34, no slotting to receive these rings is here required. Since the portion of the frame where these 4-way fittings are used is not a corner portion of the jig, no caster plate or caster is here provided, same being located at the corners of this jig, unless it is an extraordinarily long one.

In Figure 4 there is representationally illustrated a jig-frame, minus the jig-tool or matrix itself, and which includes L's and T's made as hereinbefore described and applying the principles of the invention to fabricate jig-frames for uses other than those aforedescribed. The jig frame 35 consists of the same kind of plastic tubing 12 as that afore-described, the tubing lengths being united in rectangular conformation by means of L's 37 and T's 38 composed, configured and bonded as hereinabove described, as well as by three-way fittings 13 and four-way fittings 29. Casters 17 are provided at the corners of the frame.

The L's 37 comprise identical mating halves united over a pair of tube-ends seated in hemicylindrical indentations therein, the indentations meeting at right angles and being united by a web 39. The T's 38 are similarly composed and constructed and bonded and include webs 40. The three- and four-way fittings shown in Figure 4 are as described hereinabove.

Although certain components of the illustrative forms of the invention have been described, for the sake of concreteness, with particularity as to their shape, size, proportions, etc., it is to be understood that such particularity by no means limits the breadth of the concepts and essence of the invention. The scope of the invention is as defined in the subjoined claims.

We claim:

1. A jointure for plastic tubing, comprising: a pair of substantially identical plastic sheets, the sheets being generally triangular and mutually angled and facewise matching, and the inner face of each sheet including a portion of a cylindric tube seat along each of its base-edges and along the altitude, the seat portions in each seat meeting at a common point and the portions in one sheet respectively matching those in the other sheet; a plastic tube-end seated in each cylindric seat; and an organic plastic bonding material, present on the tube end only after the seat-halves circumscribingly engage the tube-ends, this post-bonding organic plastic occupying the entire extent of the surface-of-revolution of the tube-end so as to bond the tube-end and the sheets together as a substantially monolithic block.

2. A glass-fiber jig, comprising: a centrally braced face-panel constituted by substantially rectangularly meeting substantially horizontally and vertically extending respectively, glass fiber members joined at the corners by three-way glass-fiber couplings, the central bracing comprising a glass-fiber strut joined to the horizontal members of the face-panel by glass fiber couplings, a generally rectangular base-panel of glass-fiber tubes joined to the face-panel by said three-way corner couplings; a knee-brace of glass fiber tubing extending from the upper portion of each end of the face-panel to the outer horizontal tube of the base panel; a strut extending from the lower horizontal member of the face-panel to the outer horizontal tube of the base panel; and an auxiliary panel disposed at one end of said face panel and constituted by an upright glass fiber tube united at its ends to the horizontal members of the face panel by a glass fiber, L-shaped coupling the ends of all said tubes and struts being bonded to all said couplings and to all said "members" by a bonding-material present on the tubes and struts only after the tube and strut ends have been seated in said couplings and members so as to bond the tube and strut ends and the couplings and members together as a substantially monolithic block for the full extent of congruency of said ends, with said couplings and said "members."

3. As a new article of manufacture: synthetic organic thermoplastic tubular members each having two opposite cylindric ends; a pair of inner and outer, facewise matching thermoplastic sheets, the inner surfaces of each sheet being defined by faces lying at an included angle to each other and said faces including outwardly convex indentations of which some extend toward the junction region of said faces; said indentations being so shaped and arranged with reference to the shape of the ends of thermoplastic framing tubing of the kind that has two opposed ends as to adapt said indentations to facewise mate and thereby form hollow seats for the ends of said thermoplastic tubing; said faces, including the entire area of each of said seats, lying concentrically of the seated tube-end and lying spaced radially outwardly away from the seated tube-end; and a bonding material, of the kind of synthetic organic plastic that is compatible with the composition of the thermoplastic tube-ends, occupying the longitudinally and peripherally extending gap between the tube-ends but only after the seat-forming halves are mated; said bonding material also covering each of the mating faces of said sheets; whereby the tube-ends and sheets are constituted a substantially locally unstressed monolithic block composed of one and the same material at the same stress level, thereby to obviate unbalance caused by residual stresses while rigidly uniting said tubes and sheets into an integral, one-piece framework.

4. As a new article of manufacture: thermoplastic tubular members each of which has two opposed, tubular ends; a pair of inner and outer, facewise matching thermoplastic sheets, the inner face of each sheet being defined by a pair of surfaces lying at an included angle to each other, each of said faces bearing an outwardly convex indentation extending toward the junction edge of the mutually angled faces; said junction edge bearing an outwardly convex indentation extending longitudinally of the junction region, said sheets matching facewise congruently to constitute indent..tion seats for receiving the ends of the thermoplastic framing tubular members; said faces of said sheets including the entire peripherally and longitudinally extending cylindric surface of revolution that constitutes each seat, said surface of revolution lying concentric with the respective tube-ends and being radially spaced away from each of said ends; and an organic, synthetic thermoplastic, of a composition substantially identical with that of the thermoplastic tubular members, and present on the tube-ends only after the seat-halves circumscribe the tube ends, for post-bonding the tube-ends or effecting bonding after positioning of the tube-ends in their seats; said post-bonding material occupying continuously the entire extent of the peripherally and longitudinally extending gap between the tube-ends without heaters of bonding material and similarly occupying their seats and also covering the mating faces of said sheets; whereby to integrate the thermoplastic tube-ends and sheets as a substantially monolithic unit and positively ensuring complete coverage of each tube end and seat by the bonding material; thereby to assure perfect union and preclude residual unbalanced stresses in the framework established by uniting said tubular members as aforesaid.

5. As a new article of manufacture: thermoplastic synthetic organic tubular members each of which has a pair of opposed ends; a pair of inner and outer, facewise mating plastic sheets each including a dihedral angle; an elongate indentation extending longitudinally of the base-edge of each sheet and opening on the inner face of the sheet; the dihedral-junction edge of the mutually angled sheets bearing an elongate indentation extending longitudinally thereof and opening on the inner face of the sheet; all said indentations intersecting at a common point in each sheet, said sheets being adapted to be facewise matched to thereby form said indentations into seats for the ends of said tubular members; said sheets containing within their confines all of the peripherally and longitudinally extending cylindric surface of each of said seats, said seats lying concentric with the tube ends and being spaced radially away from said ends; and a synthetic, organic plastic of substantially the same essential composition as that of said synthetic organic thermoplastic tubular members engaging the entire cylindric surface of each tube-end but only after the seat-halves are mated, this post-applied bond occupying continuously, and devoid of hiatuses, the entire area of the cylindric surface of each tube-end and also occupying the entire area of the seats and the mating faces of said sheets; whereby to constitute said tubular members and said sheets a single-piece or monolithic article, thereby to eradicate local residual, unbalanced stresses from the framework while forming a perfect union.

6. A synthetic organic plastic jointure for synthetic organic plastic tubing, comprising: synthetic organic plastic tubular members; a pair of substantially identical, inner and outer glass fiber sheets, said fiber sheets being generally of quadrilateral shape; the inner face of each sheet including a pair of mutually-angled together triangular surfaces; an outwardly-convex indentation extending along the altitude of each triangle and a similar convex indentation extending along the junction edge of the mutually angled triangular faces, said sheets mating facewise to constitute a portion of each sheet a tubular cylindric seat portion by means of said indentations; a plastic tube-end seated in each seat; and an organic synthetic exothermic, or cold-setting, material of substantially the same composition as that of the tubular members and compatible therewith, present and occupying the tube-end and also the seats, only after the seating-halves circumscribingly engage the tube-end, such post-bonding enabling the bonding material to cover the entire areas of the tube-ends and the seats continuously and uninterruptedly and free of hiatuses or 'wiped-bare" areas.

(References on following page)

References Cited in the file of this patent

UNITED STATES PATENTS

| | | |
|---|---|---|
| 394,439 | Beckert | Dec. 11, 1888 |
| 1,320,820 | Aird | Nov. 4, 1919 |
| 1,623,956 | Amiot | Apr. 12, 1927 |
| 1,737,971 | Law | Dec. 3, 1929 |
| 1,995,791 | Bounot | Mar. 26, 1935 |
| 2,018,539 | Welsh | Oct. 22, 1935 |
| 2,172,137 | Ewing | Sept. 5, 1939 |
| 2,384,324 | Martin | Sept. 4, 1945 |
| 2,705,223 | Renfrew et al. | Mar. 29, 1955 |
| 2,737,711 | Smith | Mar. 13, 1956 |
| 2,766,161 | Hagopian et al. | Oct. 9, 1956 |
| 2,801,946 | Evenblij | Aug. 6, 1957 |

OTHER REFERENCES

Silver et al.: Epoxy Resins in Glass-Cloth Laminates, "Modern Plastics," November 1950.